United States Patent
Okamoto et al.

(10) Patent No.: US 10,714,268 B2
(45) Date of Patent: Jul. 14, 2020

(54) SOLID ELECTROLYTIC CAPACITOR

(71) Applicant: Panasonic Intellectual Property Management Co., Ltd., Osaka (JP)

(72) Inventors: Koji Okamoto, Kyoto (JP); Shinya Suzuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/102,679

(22) Filed: Aug. 13, 2018

(65) Prior Publication Data
US 2019/0006114 A1 Jan. 3, 2019

Related U.S. Application Data

(63) Continuation of application No. PCT/JP2017/001886, filed on Jan. 20, 2017.

(30) Foreign Application Priority Data

Mar. 9, 2016 (JP) .................. 2016-046347

(51) Int. Cl.
*H01G 9/004* (2006.01)
*H01G 9/00* (2006.01)
(Continued)

(52) U.S. Cl.
CPC .................. *H01G 9/08* (2013.01); *H01G 2/06* (2013.01); *H01G 9/004* (2013.01);
(Continued)

(58) Field of Classification Search
CPC ............ H01G 9/15; H01G 9/08; H01G 9/004; H01G 9/012; H01G 9/025; H01G 9/0029
(Continued)

(56) References Cited

U.S. PATENT DOCUMENTS 4,375,075 A * 2/1983 Escher ..................... H01G 9/08
361/534
6,229,688 B1 5/2001 Kobayashi et al.

FOREIGN PATENT DOCUMENTS

JP 56-065640 U 6/1981
JP 2000-299261 10/2000
(Continued)

OTHER PUBLICATIONS

International Search Report of PCT application No. PCT/JP2017/001886 dated Apr. 18, 2017.

*Primary Examiner* — Arun Ramaswamy
(74) *Attorney, Agent, or Firm* — McDermott Will & Emery LLP

(57) ABSTRACT

A solid electrolytic capacitor includes a capacitor element, an anode terminal, a cathode terminal, and an outer package. The capacitor element includes an anode part, a dielectric body formed on a surface of the anode part, and a cathode part containing a conductive polymer. The anode terminal is electrically connected to the anode part. The cathode terminal is electrically connected to the cathode part. The outer package houses the capacitor element while exposing a part of the anode terminal and a part of the cathode terminal. The solid electrolytic capacitor includes a communicating path that connects a surface of the capacitor element to an exterior of the outer package.

18 Claims, 2 Drawing Sheets

(51) Int. Cl.
*H01G 9/012* (2006.01)
*H01G 9/025* (2006.01)
*H01G 9/08* (2006.01)
*H01G 9/15* (2006.01)
*H01G 9/10* (2006.01)
*H01G 2/06* (2006.01)
*H01G 9/26* (2006.01)
*H01G 9/042* (2006.01)

(52) U.S. Cl.
CPC ........... *H01G 9/0029* (2013.01); *H01G 9/012* (2013.01); *H01G 9/025* (2013.01); *H01G 9/10* (2013.01); *H01G 9/15* (2013.01); *H01G 9/26* (2013.01); *H01G 9/0425* (2013.01)

(58) Field of Classification Search
USPC ................................ 361/523, 533, 535, 525
See application file for complete search history.

(56) References Cited

FOREIGN PATENT DOCUMENTS

| | | |
|---|---|---|
| JP | 2001-006986 | 1/2001 |
| JP | 2001-057321 | 2/2001 |
| JP | 2012-204263 | 10/2012 |

\* cited by examiner

SOLID ELECTROLYTIC CAPACITOR

RELATED APPLICATIONS

This application is a continuation of the PCT International Application No. PCT/JP2017/001886 filed on Jan. 20, 2017, which claims the benefit of foreign priority of Japanese patent application No. 2016-046347 filed on Mar. 9, 2016, the contents all of which are incorporated herein by reference.

BACKGROUND

1. Technical Field

The present disclosure relates to a solid electrolytic capacitor including a capacitor element that has an anode part, a dielectric body, and a cathode part; an outer package that houses the capacitor element; and an anode terminal and a cathode terminal that each have a part exposed from the outer package.

2. Description of the Related Art

As capacitors having a small size, a large capacitance, and low ESR (Equivalent Series Resistance), promising candidates are solid electrolytic capacitors including an anode part, a dielectric body formed on a surface of the anode part, and a cathode part that covers at least a part of the dielectric body and contains a solid electrolyte.

The anode part, the dielectric body, and the cathode part constitute a capacitor element. The capacitor element is housed in, for example, an outer package made of resin. The outer package serves to protect the capacitor element and prevents the capacitor element from contacting with, for example, moisture. The outer package, however, is unable to completely block moisture in ambient air, so that the solid electrolytic capacitor is affected by moisture that inevitably infiltrates into the solid electrolytic capacitor.

Moisture that has infiltrated into the solid electrolytic capacitor is changed into gas during reflow mounting to possibly blow a neighboring component or cause a tombstone phenomenon. Thus, Unexamined Japanese Patent Publication No. 2000-299261 proposes to provide a degassing fine pore in an outer package. The fine pore is provided from a vicinity of an external terminal lead-out portion to a non-mounting surface of the outer package. Unexamined Japanese Patent Publication No. 2001-57321 proposes to provide, in a resin body that forms an outer package, an air discharge path formed of a material higher in water vapor permeability than the resin body.

SUMMARY

A solid electrolytic capacitor according to one aspect of the present disclosure includes a capacitor element, an anode terminal, a cathode terminal, and an outer package. The capacitor element includes an anode part, a dielectric body formed on a surface of the anode part, and a cathode part containing a solid electrolyte. The anode terminal is electrically connected to the anode part. The cathode terminal is electrically connected to the cathode part. The outer package houses the capacitor element while exposing a part of the anode terminal and a part of the cathode terminal. The solid electrolytic capacitor has a communicating path that connects a surface of the capacitor element to an exterior of the outer package.

According to the present disclosure, it is possible to promptly discharge moisture in the solid electrolytic capacitor to the exterior of the outer package and thus to suppress an increase in ESR that is caused by an influence of moisture.

DETAILED DESCRIPTION OF EMBODIMENT

Figures 1, 2:
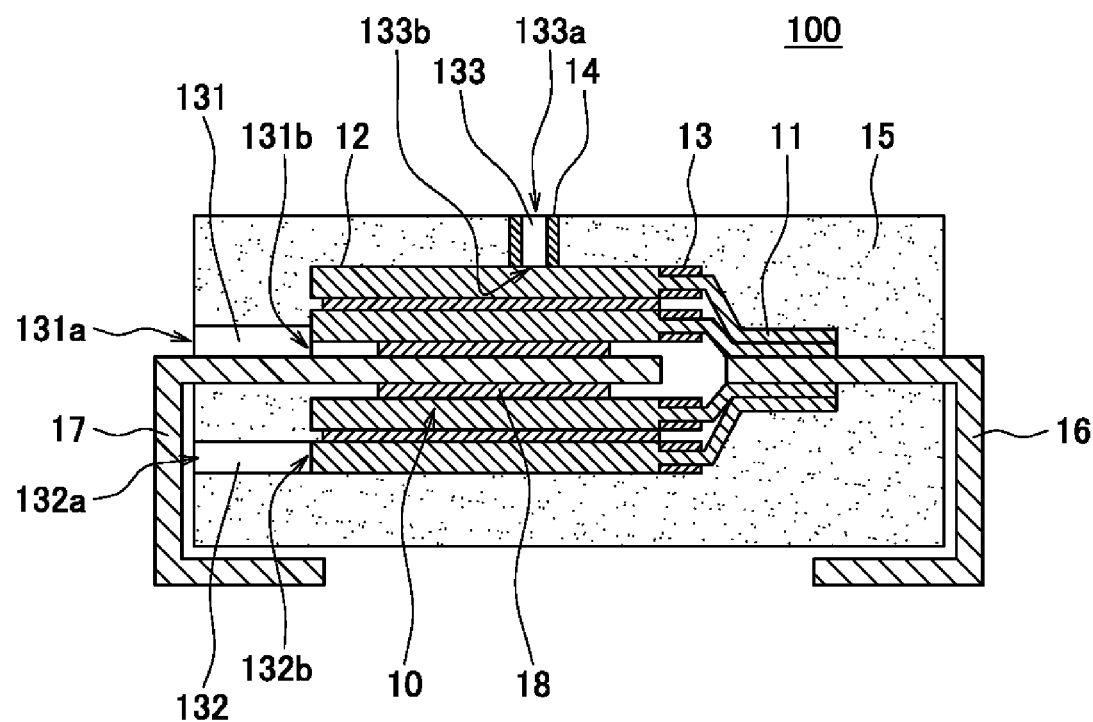
FIG. 1 is a schematic sectional view illustrating a solid electrolytic capacitor according to a first exemplary embodiment.
FIG. 2 is a schematic sectional view illustrating a solid electrolytic capacitor according to a second exemplary embodiment.

Prior to describing exemplary embodiments of the present disclosure, problems with a conventional solid electrolytic capacitor are briefly described. Moisture that has infiltrated into a solid electrolytic capacitor might condensate into dew in a capacitor element or near an interface between the capacitor element and an outer package when the solid electrolytic capacitor is transferred from a high temperature environment to a low temperature environment. The dew condensation from moisture may possibly increase ESR by contacting with the capacitor element in the outer package. Since the capacitor element is covered with the outer package, it is difficult to promptly discharge moisture collected. Also, it is difficult to promptly discharge vaporized or liquid moisture even with a substance having remarkably high moisture permeability.

A solid electrolytic capacitor according to the present disclosure includes a capacitor element having an anode part, a dielectric body formed on a surface of the anode part, and a cathode part containing a solid electrolyte. The electrolytic capacitor also includes an anode terminal electrically connected to the anode part, a cathode terminal electrically connected to the cathode part, and an outer package that houses the capacitor element while exposing a part of the anode terminal and a part of the cathode terminal. The solid electrolytic capacitor has a communicating path that connects a surface of the capacitor element to an exterior of the outer package.

The outer package is a resin body that encapsulates the capacitor element. The resin body is a cured product of thermosetting resin and is usually formed by a transfer mold method. In the transfer mold method, thermosetting mold resin is introduced, under heating at high temperature, into a mold housing the capacitor element to be encapsulated. The mold resin is cured in the mold to form the outer package.

From a viewpoint of reducing resistance to permeation of water vapor as much as possible, it is preferable that the communicating path is not a path formed of a member having water vapor permeability but a path in which only an air is present. Such a communicating path is capable of promptly discharging moisture present in the capacitor element and in an interface between the capacitor element and the outer package to the exterior of the outer package.

The surface of the capacitor element can be a surface of any component that constitutes the capacitor element, and usually a surface of the anode part, the dielectric body, and/or the cathode part. The surface of the anode part is, for example, a surface of a valve metal (e.g., aluminum, tantalum, and titanium) foil or a surface of a sintered body. The surface of the dielectric body is a surface of an oxide coating film or an insulating coating film that is formed on the surface of the anode part. The surface of the cathode part is a surface of a solid electrolyte layer that contains a solid electrolyte such as a conductive polymer and coats the dielectric body or a surface of a conductive layer that coats the solid electrolyte layer.

The conductive layer is, for example, a composite layer containing conductive particles and a resin material. The conductive layer is, for example, a carbon layer containing carbon particles and/or a metal paste layer containing metal particles. As the metal particles, silver particles are used, for example.

The communicating path is preferably a path that penetrates the outer package. The path that penetrates the outer package includes a regulated space that penetrates the outer package along thickness direction of the outer package. The regulated space can be, for example, a space such as a through-groove, a slit, or a through-hole which are shaped by a rib-shaped protrusion, or pin-shaped protrusion of a mold. The path that penetrates the outer package may be a circular through-groove that makes a circuit of the capacitor element along a peripheral surface of the capacitor element. The communicating path preferably has, as a narrowest part, a dimension ranging from 0.5 μm to 2000 μm, inclusive, for example.

The communicating path that discharges water vapor to the exterior of the outer package is suitably, for example, a through-groove, a slit, or a through-hole, each of which has a first opening at an outer surface of the outer package and a second opening at an inner surface of the outer package, while the second opening faces the surface of the capacitor element. Especially, the through-hole is easily formed.

A part of an inner wall of the through-hole may be a surface of at least one of the anode terminal and the cathode terminal. That is, the through-hole may be constituted by the surface(s) of the anode terminal and/or the cathode terminal and the outer package in cooperation. Such a path is formed by a following method. First, mold resin as a raw material for the outer package is injected into a mold while a protrusion (e.g., a pin) of the mold is in contact with, for example, the surface(s) of the anode terminal and/or the cathode terminal. Then, the protrusion is pulled out after the outer package is formed. Thus, the through-hole is formed. A contact surface of the protrusion with the anode terminal and/or the cathode terminal is not bonded to the outer package, so that it is possible to easily pull out the protrusion.

Alternatively, an insulating tubular body may be embedded in the outer package. In this case, at least a part of the inner wall of the through-hole may be an inner wall of the tubular body embedded in the outer package. By using the tubular body, it can be easy to form the through-hole as the regulated space. A shape of the tubular body is not particularly limited and may be any cylindrical type, for example. The tubular body may be embedded in the outer package by, for example, injecting mold resin as a raw material for the outer package into a mold while, after a pin-shaped protrusion is inserted into a hollow space of the tubular body from one opening, a tip (the other opening) of the tubular body is in contact with the capacitor element. The protrusion can be pulled out after the outer package is formed, to form the through-hole including the inner wall of the tubular body as at least a part of the inner wall of the through-hole. Also in this case, the pin-shaped protrusion is not bonded to the outer package. Therefore, it is possible to easily pull out the protrusion.

The first opening may be opposite to a part of at least one of the anode terminal and the cathode terminal, the part being exposed from the outer package. In this case, the first opening is shielded by a surface of the part of the anode terminal or the cathode terminal, the surface being opposite to the first opening, the part being exposed from the outer package. Accordingly, it is possible to prevent foreign matter from infiltrating into the outer package through the first opening. In addition, this configuration gives a solid electrolytic capacitor having a good appearance. On the other hand, the part of the anode terminal or the cathode terminal that shields the first opening does not seal the first opening, so that moisture is easily discharged from a gap between a peripheral edge of the first opening and an inner surface of the anode terminal or the cathode terminal.

The larger the second opening that faces the surface of the capacitor element is, the greater a function of discharging moisture to the exterior is. On the other hand, the smaller the first opening that exists at the outer surface of the outer package is, the better appearance the solid electrolytic capacitor has. Accordingly, the second opening may be made larger than the first opening. Such a path is obtained by controlling, for example, a shape of the protrusion and quality of a material used for forming the outer package. For example, an outer peripheral surface of a pin-shaped protrusion formed of a hard material and curved in an arc may be brought into contact with the surface of the capacitor element or a tip of a pin-shaped protrusion formed of a soft material is bent and brought into contact with the surface of the capacitor element, to shape the through-hole. This method makes the second opening of the through-hole connect to the surface of the capacitor element and makes the second opening larger than a diameter of the tip of the protrusion. On the other hand, the first opening corresponds to the diameter of the protrusion to have a smaller area than an area of the second opening.

In the meantime, the area of the second opening may be smaller than or the same as the area of the first opening. It is possible to form the second opening that is smaller than the first opening, with use of, for example, a pin-shaped protrusion that tapers toward a tip. The protrusion that tapers toward the tip is easily pulled out from the outer package to enable easy production of the solid electrolytic capacitor.

A periphery of the second opening on the inner surface of the outer package is not necessarily in direct contact with the surface of the capacitor element. That is, there may be a gap between the surface of the capacitor element and an opening end of the second opening on the outer package. This enlarges a connecting part between the surface of the capacitor element and the communicating path to make moisture easily move from the capacitor element to the communicating path. Thus, the function of discharging moisture to the exterior is largely enhanced. The gap described above can be formed by, for example, intentionally forming a peeling interface between the capacitor element and the outer package with use of a mold release agent.

The communicating path may be at least one of a gap between the outer package and the cathode terminal and a gap between the outer package and the anode terminal. The gap described above can be formed by, for example, intentionally forming a peeling interface between the cathode terminal and/or the anode terminal and the outer package. The peeling interface can be formed by, for example, forming the outer package while forming in advance a mold release layer by a mold release agent on the surface of the cathode terminal and/or the anode terminal. In this case, the communicating path is a slit path provided between the surface(s) of the anode terminal and/or the cathode terminal and the outer package.

The outer package may include a plurality of outer package members. That is, the outer package may be a combination of a plurality of parts. In this case, the communicating path is easily formed as a gap between two adjacent outer package members.

Next, exemplary embodiments of the solid electrolytic capacitor according to the present disclosure are described in further detail with reference to drawings.

First Exemplary Embodiment

FIG. 1 is a schematic sectional view illustrating solid electrolytic capacitor 100 according to a first exemplary embodiment. Solid electrolytic capacitor 100 includes a plurality of capacitor elements 10 connected in parallel, outer package 15 that encapsulates a stacked body of capacitor elements 10 and is made of resin, and anode terminal 16 and cathode terminal 17 that are each exposed to an exterior of outer package 15. Solid electrolytic capacitor 100 has a substantially hexahedral outer shape.

Capacitor element 10 includes anode part 11, a dielectric body (not shown) formed on a surface of anode part 11, and cathode part 12 including a conductive polymer that is formed to cover the dielectric body. Insulating layer 13 that has a function of preventing a short circuit is provided at a boundary between anode part 11 and cathode part 12.

A foil of a valve metal is used for anode part 11. The dielectric body is, as an example, a coating film that is provided on a part of anode part 11 and is made of an oxide of the valve metal. When the anode part is an aluminum foil, the dielectric body is a coating film of aluminum oxide.

Cathode part 12 includes a solid electrolyte layer (not shown) containing a conductive polymer, and a cathode layer covering a surface of the solid electrolyte layer. The cathode layer includes a carbon layer covering the surface of the solid electrolyte layer, and a silver paste layer covering a surface of the carbon layer. That is, cathode part 12 has the silver paste layer as an outermost layer.

One end of anode terminal 16 disposed in outer package 15 is electrically connected to anode part 11 by, for example, welding. One end of cathode terminal 17 disposed in outer package 15 is electrically connected to cathode part 12 with conductive paste 18. Conductive paste 18 may contain silver particles as in silver paste that constitutes the cathode layer. Here, conductive paste 18 also constitutes a part of the cathode layer (that is, a part of cathode part 12).

In solid electrolytic capacitor 100, paths 131, 132, and 133 are formed as communicating paths, each of which connects a surface of capacitor element 10 to the exterior of outer package 15.

Path 131 is a through-hole having first opening 131a formed at an outer surface of outer package 15 and second opening 131b formed at an inner surface of outer package 15. Second opening 131b faces a surface of cathode part 12. A depth direction of path 131 is along the surface of cathode part 12 and is substantially parallel with the surface of cathode part 12. A part of an inner wall of path 131 is constituted by a surface of cathode terminal 17. The other part of the inner wall of path 131 is constituted by an internal surface of outer package 15. Here, the internal surface does not mean an external surface that constitutes an appearance of outer package 15 but means a surface that constitutes the inner wall of the path. Path 131 is simultaneously formed with outer package 15 by, for example, injecting mold resin into a mold while a flat surface of a pin having a shape with a semicircular cross-section is in contact with the surface of cathode terminal 17. Since the flat surface of the pin is not bonded to outer package 15, it is possible to easily pull out the pin.

Path 132 is also a through-hole having first opening 132a formed at the outer surface of outer package 15 and second opening 132b formed at the inner surface of outer package 15. Second opening 132b faces a surface of cathode part 12. A depth direction of path 132 is along the surface of cathode part 12. Since first opening 132a is opposite to a part of cathode terminal 17 that is exposed from outer package 15, existence of first opening 132a is not identified from the appearance. Hence, the solid electrolytic capacitor can have a good appearance. Though the part of cathode terminal 17 shields first opening 132a, there is a gap between an opening end of first opening 132a in outer package 15 and cathode terminal 17. Thus, moisture can be discharged from the gap to the exterior.

Path 133 is also a through-hole having first opening 133a formed at the outer surface of outer package 15 and second opening 133b at the inner surface of outer package 15. Second opening 133b faces a surface of cathode part 12. A depth direction of path 133 is toward a point where the path intersects with the surface of cathode part 12 (here, substantially perpendicular to the surface of cathode part 12). Path 133 is a hollow space of tubular body 14 that is embedded in outer package 15 and is an insulating cylinder. An inner wall of tubular body 14 forms an inner wall of the through-hole. For example, a cylindrical pipe made of resin is used as tubular body 14. Path 133 formed by tubular body 14 is simultaneously formed with outer package 15 by injecting mold resin into a mold while inserting a pin into the hollow space of tubular body 14 and allowing a tip of tubular body 14 to be in contact with cathode part 12 of the capacitor element. Since the pin is merely inserted into the hollow space of tubular body 14, it is possible to easily pull out the pin.

Second Exemplary Embodiment

FIG. 2 is a schematic sectional view illustrating solid electrolytic capacitor 200A according to a second exemplary embodiment. Solid electrolytic capacitor 200A is different from the first exemplary embodiment in formation of an anode terminal and a cathode terminal but is similar to the first exemplary embodiment in terms of a basic structure. That is, solid electrolytic capacitor 200A includes a plurality of capacitor elements 20 connected in parallel, outer package 25 that encapsulates a stacked body of capacitor elements 20 and is made of resin, and anode terminal 26 and cathode terminal 27 that are each exposed to an exterior of outer package 25. Solid electrolytic capacitor 200A has a substantially hexahedral outer shape.

Anode part 21 is connected by, for example, welding to anode stage 21d connected to anode terminal 26 while the anode part sandwiched along a stacking direction by anode holder 21c having a u-shaped cross-section. Cathode part 22 is connected to cathode terminal 27 with conductive paste 28 interposed between the cathode part and the cathode terminal.

Capacitor element 20 includes anode part 21, a dielectric body (not shown) formed on a surface of anode part 21, and cathode part 22 including a conductive polymer that is formed to cover the dielectric body. Insulating layer 23 that has a function of preventing a short circuit is provided at a boundary between anode part 21 and cathode part 22. A configuration of anode part 21, the dielectric body, and cathode part 22 is the same as in capacitor element 10 of the first exemplary embodiment.

In solid electrolytic capacitor 200A, paths 231, 232, and 233 are formed as communicating paths. Paths 231 to 233 each connect a surface of capacitor element 20 to the exterior of outer package 25.

Path 231 is a through-hole having first opening 231a at an outer surface of outer package 25 and second opening 231b at an inner surface of outer package 25. And second opening 231b faces a surface of cathode part 22. A depth direction of path 231 is toward a point where the path intersects with the surface of cathode part 22, and is substantially perpendicular to the surface of cathode part 22. For example, path 231 is shaped by a pin formed of a soft material (e.g., fluororesin such as polytetrafluoroethylene, silicone, and epoxy resin). That is, path 231 is simultaneously formed with outer package 25 by injecting mold resin into a mold while bending a tip of a pin and allowing the pin to be sufficiently in contact with the surface of capacitor element 20 (cathode part 22). Accordingly, second opening 231b has a larger area than an area of first opening 231a.

Path 232 is also a through-hole having first opening 232a at the outer surface of outer package 25 and second opening 232b at the inner surface of outer package 25. Second opening 232b faces a surface of cathode part 22. Here, since first opening 232a is opposite to a part of cathode terminal 27 that is exposed from outer package 25, existence of first opening 232a is not identified from an appearance of the outer package. Hence, the solid electrolytic capacitor can have a good appearance.

Path 233 is a gap between outer package 25 and cathode terminal 27. The gap communicates along cathode terminal 27 from the surface of capacitor element 20 (a surface of a solid electrolyte layer in cathode part 22 or a surface of a carbon layer or a silver paste layer in cathode part 22) to the exterior of outer package 25. Such a gap is formed by, for example, intentionally forming a peeling interface between cathode terminal 27 and outer package 25. Specifically, the gap may be formed by applying a mold release agent to a part of cathode terminal 27 that is other than a contact part between cathode part 22 and conductive paste 28, joining cathode terminal 27 to cathode part 22 while retaining the mold release agent on the part of the cathode terminal, and then forming outer package 25. Alternatively, the gap may be formed by forming in advance an oxide coating film having low strength at a part of cathode terminal 27 that is scheduled to be peeled, forming outer package 25, and then breaking the oxide coating film. Since such a gap is less likely to give damage to the capacitor element compared with, for example, the through-hole formed by directly contacting a pin with the capacitor element, it is possible to increase reliability of the capacitor element. Further, the gap is unlikely to be identified in appearance, so that the solid electrolytic capacitor can have a good appearance.

Figure 3:
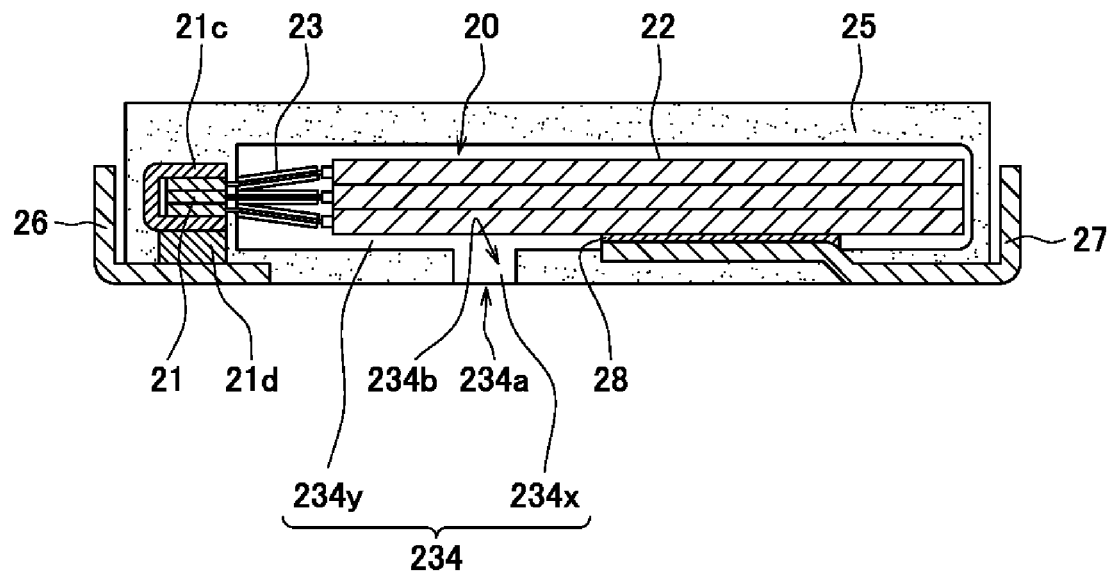
FIG. 3 is a schematic sectional view illustrating a modified example of the solid electrolytic capacitor according to the second exemplary embodiment.

FIG. 3 is a schematic sectional view illustrating solid electrolytic capacitor 200B according to a modified example of the second exemplary embodiment. Solid electrolytic capacitor 200B is different from the second exemplary embodiment in formation of a communicating path but is the same as the second exemplary embodiment in terms of a basic structure. Accordingly, a same symbol is used for a same constitutional element.

Solid electrolytic capacitor 200B includes path 234 as a communicating path. Path 234 includes through-hole 234x having first opening 234a at an outer surface of outer package 25 and second opening 234b at an inner surface of outer package 25. A periphery (opening end) of second opening 234b is not in direct contact with a surface of capacitor element 20.

On the other hand, since gap 234y is present between the surface of capacitor element 20 and the opening end of second opening 234b on outer package 25, second opening 234b communicates to the surface of capacitor element 20. Accordingly, path 234 connects the surface of capacitor element 20 to an exterior of outer package 25. As illustrated in FIG. 3, gap 234y may be provided to surround capacitor element 20. This greatly enhances the function of discharging moisture to the exterior.

Gap 234y may be provided by any method and may be formed by, for example, intentionally forming a peeling interface between capacitor element 20 and outer package 25 with use of a mold release agent. Alternatively, gap 234y may be formed by coating capacitor element 20 in advance with a material that is changed into gas at high temperature, and then forming outer package 25. Outer package 25 is formed by injecting mold resin at high temperature into a mold housing capacitor element 20. In this procedure, the material coating capacitor element 20 is heated at high temperature and changed into gas. The material that has been changed into gas is discharged through through-hole 234x to the exterior.

Third Exemplary Embodiment

Figure 4:
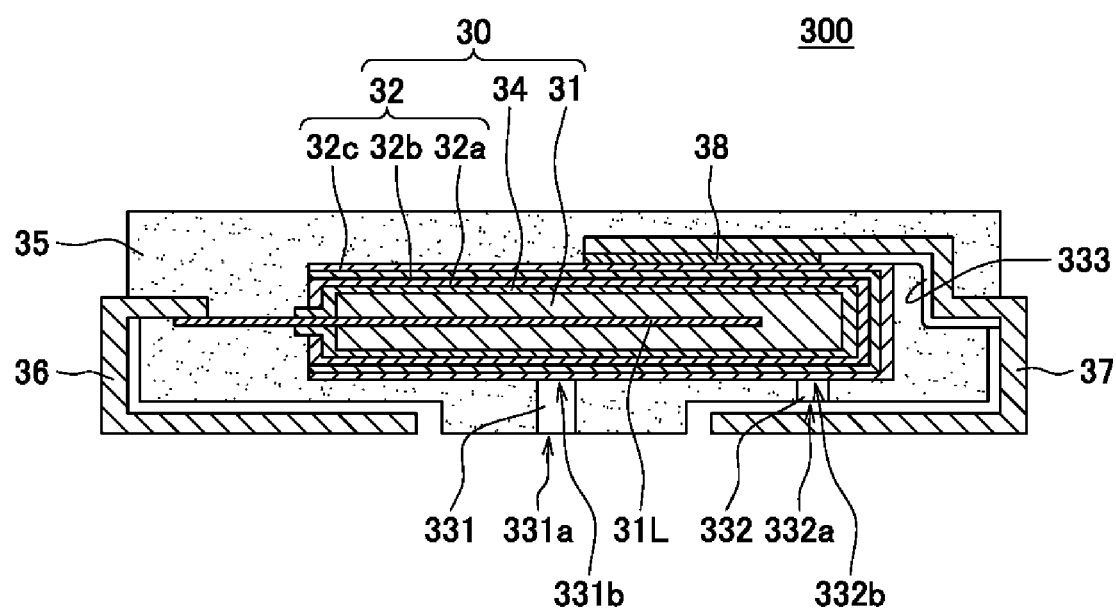
FIG. 4 is a schematic sectional view illustrating a solid electrolytic capacitor according to a third exemplary embodiment.

FIG. 4 is a schematic sectional view illustrating solid electrolytic capacitor 300 according to a third exemplary embodiment. Solid electrolytic capacitor 300 includes capacitor element 30 having a hexahedral outer shape, outer package 35 that encapsulates capacitor element 30, and anode terminal 36 and cathode terminal 37 that each have a part exposed to an exterior of outer package 35. Capacitor element 30 has a substantially hexahedral outer shape. Solid electrolytic capacitor 300 also has a substantially hexahedral outer shape as in capacitor element 30.

Capacitor element 30 includes anode body 31 that is a hexahedral porous sintered body, anode lead 31L planted upright in anode part 31, dielectric body 34 formed on a surface of anode body 31, and solid electrolyte layer 32a that is formed on a surface of dielectric body 34 and contains a conductive polymer. Capacitor element 30 further includes carbon layer 32b covering a surface of solid electrolyte layer 32a, and silver paste layer 32c covering a surface of carbon layer 32b. Carbon layer 32b and silver paste layer 32c constitute a cathode layer. Solid electrolyte layer 32a and the cathode layer (32b, 32c) constitute cathode part 32.

A part of anode lead 31L that is extended from anode part 31 is connected to anode terminal 36 by, for example, welding. On the other hand, cathode part 32 is connected to cathode terminal 37 with conductive paste 38 interposed between the cathode part 32 and the cathode terminal 37.

In solid electrolytic capacitor 300, paths 331, 332, and 333 are formed as communicating paths, each of which connects a surface of capacitor element 30 to the exterior of outer package 35.

Path 331 is a through-hole having first opening 331a at an outer surface of outer package 35 and second opening 331b at an inner surface of outer package 35. Second opening 331b faces a surface of cathode part 32.

Path 332 is a through-hole having first opening 332a at the outer surface of outer package 35 and second opening 332b at the inner surface of outer package 35. Second opening 332b faces the surface of cathode part 32. First opening 332a is opposite to a part of cathode terminal 37 that is exposed from outer package 35.

Path 333 is a gap between outer package 35 and cathode terminal 37. Path 333 communicates along cathode terminal 37 from the surface of cathode part 32 (the surface of solid electrolyte layer 32a or the surface of carbon layer 32b or silver paste layer 32c) to the exterior of outer package 35. Paths 331 to 333 can be formed by the same methods as the methods described above.

In solid electrolytic capacitors 100, 200A, 300, the plurality of paths are formed. A number of paths, however, is not particularly limited.

The present disclosure is usable for a solid electrolytic capacitor including a capacitor element that has an anode part, a dielectric body, and a cathode part; an outer package that houses the capacitor element; and an anode terminal and a cathode terminal that each have a part exposed from the outer package, the outer package being, for example, a cured product formed by transfer molding of thermosetting resin.

What is claimed is:

1. A solid electrolytic capacitor comprising:
   a capacitor element including an anode part, a dielectric body formed on a surface of the anode part, and a cathode part containing a solid electrolyte;
   an anode terminal electrically connected to the anode part;
   a cathode terminal electrically connected to the cathode part;
   an outer package that houses the capacitor element while exposing a part of the anode terminal and a part of the cathode terminal; and
   an insulating tubular body embedded in the outer package, wherein:
   the solid electrolytic capacitor has a communicating path that connects a surface of the capacitor element to an exterior of the outer package and penetrates the outer package, and
   at least a part of an inner wall of the communicating path is constituted by an inner wall of the insulating tubular body.

2. The solid electrolytic capacitor according to claim 1, wherein a part of the inner wall of the communicating path is constituted by a surface of at least one of the anode terminal and the cathode terminal.

3. The solid electrolytic capacitor according to claim 1, wherein:
   the communicating path is a through-hole having a first opening at an outer surface of the outer package and a second opening at an inner surface of the outer package, and
   the second opening faces the surface of the capacitor element.

4. The solid electrolytic capacitor according to claim 3, wherein the first opening is covered, via a gap, by at least one of the part of the anode terminal and the part of the cathode terminal, the part of the anode terminal and the part of the cathode terminal each being exposed from the outer package.

5. The solid electrolytic capacitor according to claim 3, wherein the outer package at a periphery of the second opening is not in direct contact with the surface of the capacitor element.

6. The solid electrolytic capacitor according to claim 3, wherein the second opening has a larger area than an area of the first opening.

7. The solid electrolytic capacitor according to claim 1, wherein the communicating path is at least one of a gap between the outer package and the cathode terminal and a gap between the outer package and the anode terminal.

8. The solid electrolytic capacitor according to claim 1, wherein:
   the outer package includes a plurality of outer package members; and
   the communicating path is a gap between two adjacent outer package members of the plurality of outer package members.

9. A solid electrolytic capacitor comprising:
   a capacitor element including an anode part, a dielectric body formed on a surface of the anode part, and a cathode part containing a solid electrolyte;
   an anode terminal electrically connected to the anode part;
   a cathode terminal electrically connected to the cathode part; and
   an outer package that houses the capacitor element while exposing a part of the anode terminal and a part of the cathode terminal, wherein:
   the solid electrolytic capacitor has a communicating path that connects a surface of the capacitor element to an exterior of the outer package and penetrates the outer package,
   the communicating path is a through-hole having a first opening at an outer surface of the outer package and a second opening at an inner surface of the outer package,
   the second opening faces the surface of the capacitor element, and
   the second opening has a larger area than an area of the first opening.

10. The solid electrolytic capacitor according to claim 9, wherein a part of an inner wall of the communicating path is constituted by a surface of at least one of the anode terminal and the cathode terminal.

11. The solid electrolytic capacitor according to claim 9, further comprising an insulating tubular body embedded in the outer package, wherein at least a part of an inner wall of the communicating path is constituted by an inner wall of the insulating tubular body.

12. The solid electrolytic capacitor according to claim 9, wherein the first opening is covered, via a gap, by at least one of the part of the anode terminal and the part of the cathode terminal, the part of the anode terminal and the part of the cathode terminal each being exposed from the outer package.

13. The solid electrolytic capacitor according to claim 9, wherein the outer package at a periphery of the second opening is not in direct contact with the surface of the capacitor element.

14. The solid electrolytic capacitor according to claim 9, wherein the communicating path is at least one of a gap between the outer package and the cathode terminal and a gap between the outer package and the anode terminal.

15. The solid electrolytic capacitor according to claim 9, wherein:
   the outer package includes a plurality of outer package members; and
   the communicating path is a gap between two adjacent outer package members of the plurality of outer package members.

16. A solid electrolytic capacitor comprising:
a capacitor element including an anode part, a dielectric body formed on a surface of the anode part, and a cathode part containing a solid electrolyte;
an anode terminal electrically connected to the anode part;
a cathode terminal electrically connected to the cathode part; and
an outer package that houses the capacitor element while exposing a part of the anode terminal and a part of the cathode terminal, wherein:
the solid electrolytic capacitor has a communicating path that connects a surface of the capacitor element to an exterior of the outer package and penetrates the outer package,
the communicating path is a through-hole having a first opening at an outer surface of the outer package and a second opening at an inner surface of the outer package, and
the first opening is covered, via a gap, by the part of the cathode terminal which is exposed from the outer package and bent to be along the outer surface of the outer package.

17. The solid electrolytic capacitor according to claim 16, wherein a part of an inner wall of the communicating path is constituted by a surface of the cathode terminal.

18. The solid electrolytic capacitor according to claim 16, wherein the outer package at a periphery of the second opening is not in direct contact with the surface of the capacitor element.

\* \* \* \* \*